(12) United States Patent
Jolitz et al.

(10) Patent No.: US 7,700,028 B2
(45) Date of Patent: Apr. 20, 2010

(54) METHOD FOR MANUFACTURING ROOFING PRODUCTS

(75) Inventors: Randal J. Jolitz, Joplin, MO (US); Dennis Dean Carlson, McPherson, KS (US); Charles Doyle Ziulkowski, Carl Junction, MO (US)

(73) Assignee: Epoch Composite Products, Inc., Lamar, MO (US)

( * ) Notice: Subject to any disclaimer, the term of this patent is extended or adjusted under 35 U.S.C. 154(b) by 507 days.

(21) Appl. No.: 10/457,728

(22) Filed: Jun. 9, 2003

(65) Prior Publication Data

US 2004/0178532 A1    Sep. 16, 2004

Related U.S. Application Data (63) Continuation-in-part of application No. 10/387,823, filed on Mar. 12, 2003, now Pat. No. 6,935,089.

(51) Int. Cl.
*B29C 45/00* (2006.01)
(52) U.S. Cl. .............. 264/297.2; 264/297.4; 264/297.8; 264/328.1
(58) Field of Classification Search .................. 264/160, 264/37.32, 151, 161, 210.2
See application file for complete search history.

(56) References Cited

U.S. PATENT DOCUMENTS

| | | | | |
|---|---|---|---|---|
| 1,870,443 A | * | 8/1932 | Cumfer | 270/58.29 |
| 1,886,970 A | * | 11/1932 | Moone | 270/58.34 |
| 1,993,086 A | * | 3/1935 | Chaffee | 52/542 |
| 4,233,100 A | * | 11/1980 | Cunningham et al. | 156/260 |
| 5,094,058 A | | 3/1992 | Slocum | |
| 5,186,980 A | * | 2/1993 | Koschitzky | 427/187 |
| 5,926,388 A | * | 7/1999 | Kimbrough et al. | 700/118 |
| 5,976,457 A | * | 11/1999 | Amaya et al. | 419/36 |
| 6,282,858 B1 | * | 9/2001 | Swick | 52/533 |
| 6,546,688 B1 | * | 4/2003 | Parsons | 52/518 |

\* cited by examiner

*Primary Examiner*—Edmund H. Lee
(74) *Attorney, Agent, or Firm*—Husch Blackwell Sanders LLP (57) ABSTRACT

A method of making a roofing product such as a shingle is provided. One such method includes creating a mixture having at least a polymer and a filler, forming a sheet from the mixture, cooling the sheet, embossing the sheet, forming multiple roofing products from the sheet and bundling at least some of the roofing products together. This method is performed using an automated procedure. Another method of the present invention involves creating a composite roofing product using mold cavities, using a robot to transfer some of the roofing products from some of the mold cavities to a conveying system, and stacking together at least two of the roofing products that have different colors of different surface configurations.

10 Claims, 10 Drawing Sheets

METHOD FOR MANUFACTURING ROOFING PRODUCTS

CROSS-REFERENCE TO RELATED APPLICATIONS

This application is a continuation in part of the patent application entitled METHOD FOR MANUFACTURING ROOFING PRODUCTS having application Ser. No. 10/387,823 filed on Mar. 12, 2003 now U.S. Pat. No. 6,935,089.

STATEMENT REGARDING FEDERALLY SPONSORED RESEARCH OR DEVELOPMENT

None.

BACKGROUND OF THE INVENTION

The present invention relates to a method of manufacturing roofing products. In particular, the invention relates to an automated manufacturing process for producing shingles.

Traditional roofing products such as asphalt shingles, wood shake shingles, slate shingles and metal panels have both benefits and detriments. For instance, wood shake and slate roofs are aesthetically pleasing to many homeowners. However, wood shake shingles are considered a fire hazard while slate shingles are very expensive and subject to cracking.

Roofing product manufacturers have introduced less expensive roofing products that simulate wood shakes and slate roofing. For example, some asphalt shingles have been developed that resemble wood shake or slate shingles. These asphalt products, however, typically do not have the structural rigidity of slate or wood. Metal and plastic shingles that simulate wood shake and slake shingles also have been developed. These products, however, are subject to denting and breakage.

Roofing product manufacturers have also developed composite roofing products that resemble more traditional roofing products, including wood shakes and slates. Manufacturing these composite roofing products, which are typically composed of at least a polymer and a filler component, has traditionally involved the use of extrusion, pressing, and/or molding techniques. An example of a process involving extrusion of roofing products composed primarily of asphalt appears in U.S. Pat. No. 5,690,876 to Gallo, Jr. Examples of molding processes used in making composite roofing products include those in U.S. Pat. No. 6,025,052 to Maurer et al.; U.S. Pat. No. 6,112,492 to Wells et al.; and U.S. Pat. No. 5,635,124 to Abrams et al. Finally, use of both extrusion and molding is disclosed in U.S. Pat. No. 6,290,885 to Nakai et al.

Although some of these patents promote economics of scale in aspects of their manufacturing, the references do not disclose a manufacturing solution that takes advantage of economics of scale and that may be automated from virtually beginning to end.

SUMMARY OF THE INVENTION

In order to overcome the stated problems and limitations there is provided a method for creating shingles through the use of at least a partially automated system. In one embodiment, the method of the present invention includes an automated procedure having the steps of creating a mixture having a filler and a polymer, forming a sheet from the mixture, cooling the sheet, embossing the sheet, forming multiple roofing products from the sheet, and associating at least some of the roofing products with one another. In another embodiment, the present invention includes a method of making shingles that comprises the steps of creating composite shingles using at least one mold cavity, using a robot to transfer some of the shingles from some of the mold cavities to a conveying system, and stacking together at least two of the shingles wherein the shingles have different colors or different surface configurations.

Additional objects, advantages and novel features of the present invention will be set forth in part in the description which follows and the attached figures and will in part become apparent in practice.

BRIEF DESCRIPTION OF THE DRAWING

The present invention is described in detail below with reference to the attached drawing Figures, wherein.

DETAILED DESCRIPTION OF THE INVENTION

Those skilled in the art will appreciate that in this detailed description certain well known components and assembly techniques have been omitted so that the present methods are not obscured in unnecessary detail. Dimensions provided in English units may be translated to corresponding metric units by rounding to the nearest millimeter.

Sheet Line Method

Figure 1:
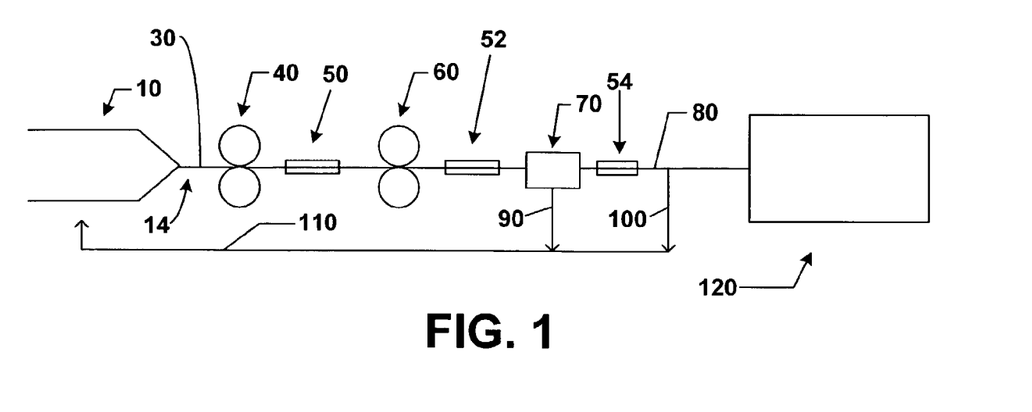
FIG. 1 is a schematic representation of a sheet line layout that may be used in accordance with the present invention.
Figure 3:
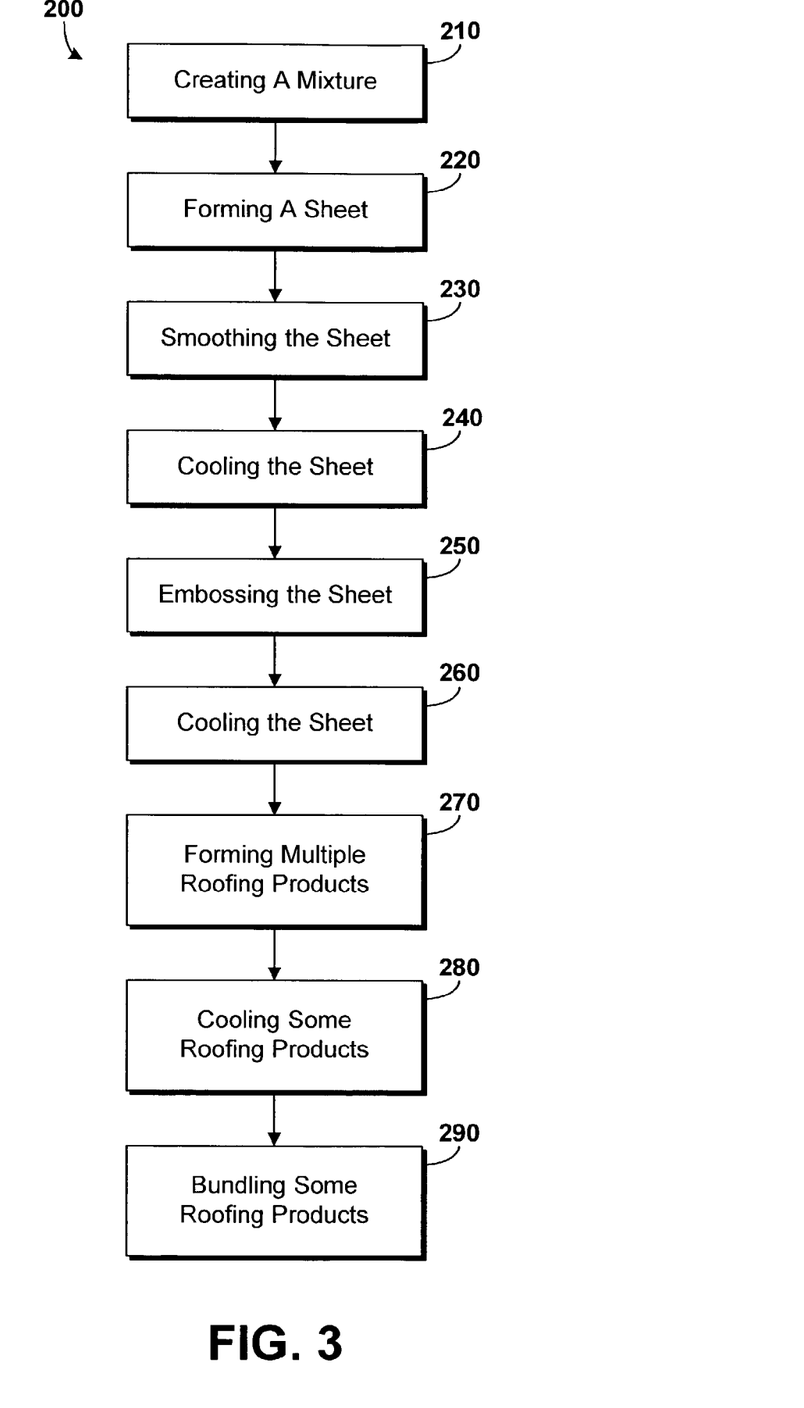
FIG. 3 is a flowchart illustrating one embodiment of the process of the present invention.

One or more of the present methods may be used in accordance with the sheet line method shown in FIG. 1. One such method is designated with reference numeral 200, the steps of which are illustrated in FIG. 3. In step 210, a mixture is created from starting materials that include at least a polymer and a filler. Additional additives, including a colorant, a fire retardant and/or an ultraviolet light protector, may also be included in the starting materials.

Figure 2A:
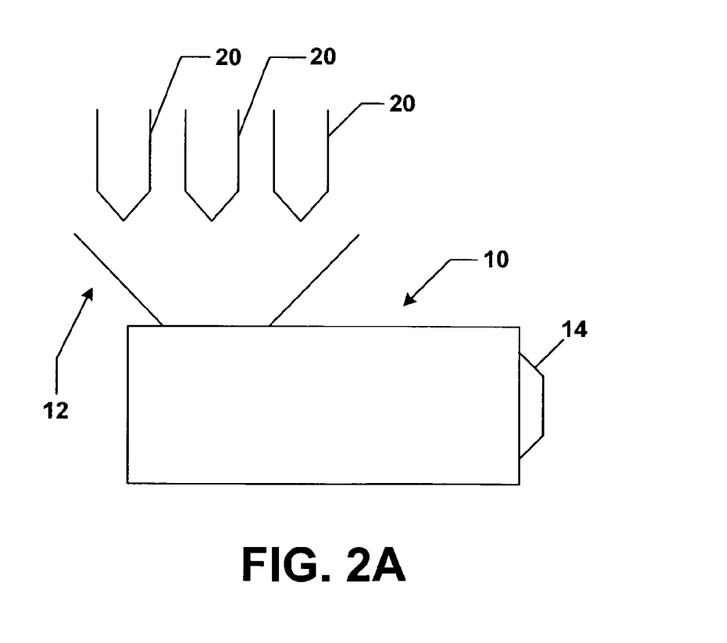
FIG. 2A is a schematic representation showing one embodiment of a feeder/material handler and extruder combination that may be used to carry out the present invention.

As shown in FIG. 1, step 210 may be carried out by using an extruder 10, which may include (e.g., be connected to) a mixer. To create the mixture, the starting materials are fed into extruder 10. When extruder 10 includes a mixer, the starting materials are fed by feeders and/or material handlers into a hopper of the mixer. For example, as best seen in FIG. 2, three feeders/material handlers 20 may be used to feed starting material into a hopper 12 of a mixer connected to extruder 10. Although not shown, the feeders/material handlers may be coupled with each other so that the components of the eventual mixture (e.g., at least a polymer and a filler) are mixed prior to being dumped into the hopper of the mixer (or hopper of the extruder if the extruder lacks a separate mixer) where additional mixing occurs. The mixing by one or more of the feeders and/or material handlers is within the scope of step 210.

Examples of starting materials for the mixture include a polymer such as polyethylene and a filler such as limestone. Specifically, the polyethylene may be high- or low-density polyethylene, and may be virgin or recycled. The limestone used in the mixture may be crushed or otherwise broken into small pieces. As indicated, a colorant or dye may also be used as a starting material, as may other materials such as UV-protectors and fire retardants. The starting materials may be fed at ambient temperature into extruder 10 or, in the alternative, the starting materials may be fed at ambient temperature into feeders/material handlers 20. If used, feeders/material handlers 20 work together to mix the starting material and to heat them to some extent (but not necessarily to a molten state) prior to transferring the material into extruder 10 or, in some cases, hopper 12 of a mixer connected to extruder 10.

Suitable extruders for use in the present invention include, but are not limited to, hot-feed (i.e., the starting materials enter the extruder in a state heated above ambient temperature), cold-feed (i.e., the starting materials enter the extruder at ambient temperature), or screw-type extruders, such as single-screw or multiple-screw extruders. When no mixer is attached to extruder 10 to carry out step 210, it will be understood that an extruder with a screw designed to mix the starting materials to create the mixture may be used. Alternatively, where a mixer is used in creating the mixture, the extruder may include a feed screw that is designed to pump the mixture and not contribute to the creation of the mixture.

One example of a suitable extruder for use with the present methods is the CP2500 manufactured by the Farrel Corporation in Ansonia, Conn. and described, at least in part, in the CP2500V Series II™ Instruction Manual from Farrel Corporation. The CP2500 includes a continuous mixer, where the starting materials are introduced, and an extruder, where the mixture is released. More specifically, the starting material is compounded within the mixing chamber barrel of the CP2500 where it is heated until the polymer reaches a molten state. The mixture receives heat from both the externally-heated mixing chamber barrel and the friction between the rotors of the mixer, the mixture itself, and the inside of the barrel. As a result of the heating, the polymer will encapsulate some or all the filler. The temperature of the mixture at this point may be between about 325 to 600 degrees Fahrenheit.

Continuing with this example of creating a mixture at step 210, the heated barrel of the mixer may be controlled to adjust the temperature limits of the mixture. A maximum temperature may be set, and if the temperature of the mixture exceeds that maximum temperature, the external heater will turn off. A minimum temperature may also be set, and if the temperature of the mixture falls below or starts off at or below that minimum temperature, the external heater of the mixing chamber barrel will turn on. It should be understood that the external heater of the barrel may operate continuously although it may be tripped off under the appropriate circumstances.

After creating the mixture in step 210, a sheet is formed in step 220. As shown in FIG. 3, a sheet may be formed by extruding the mixture through a die such as a sheet die 14. It will be understood that die 14 may be in the form of a sheet die or any other similar stricture or device. Die 14 is shown generally as a point on the end of extruder 10 in FIGS. 1 and 2. In carrying out step 220, extruder 10 forces the mixture through die 14 thereby forming a sheet that then begins to travel along a conveyor, such as conveyor belt 30. The temperature of the sheet after exiting die 14 may be between about 225 to 500 degrees Fahrenheit.

When using the CP2500, the mixture is fed from the mixer to the extruder through an enclosed connecting chute. The CP2500 is equipped with a pneumatically-operated pusher assembly for the extruder hopper that allows the mixture to be crammer-fed into the extruder barrel. The extruder of the CP2500 has a feedscrew that is designed to pump only and, therefore, the extrusion of the mixture will raise its temperature minimally, if at all. It should be understood, however, that both the hopper and the barrel of the extruder are externally heated, so the mixture may be kept in a molten state to facilitate formation of the sheet. Thus, in carrying out step 220, a sheet may be formed by forcing the mixture through die 14 using the feedscrew of the extruder on the CP2500.

One example of a die 14 that may be used for carrying out step 220 is a 28-inch Masterslide HD sheet die available from Battenfeld Gloucester Engineering Company, Inc. of Gloucester, Mass. Preferably, die 14 will be dimensioned to create a sheet that is approximately ¼ inch thick by 26 inches wide. Of course, other sheets of other desired dimensions may be created using different dies.

Step 230 includes smoothing the sheet, which may be accomplished by passing the sheet through a pair of calendar rolls (sometimes referred to as a "calendar stack" in the art). As best seen in FIGS. 1 and 3, the sheet formed in step 220 may be conveyed along conveyor belt 30 to calendar rolls 40, which are oriented one above the other. Alternatively, extruder 10 and die 14 may be positioned sufficiently close to calendar rolls 40 so that conveyor belt 30 is unnecessarily. Conveyor belt 30 may be driven automatically or manually. In addition, to smoothing the sheet, calendar rolls 40 also may reduce the thickness of the sheet by adjusting the nip setting (i.e., the distance between the surfaces of the rolls). Calendar rolls 40 may either be stationary and unconnected to conveyor belt 30 or be coupled by a movable station to conveyor belt 30 so that the position of calendar rolls 40 may vary along a continuous section of conveyor belt 30. After smoothing the sheet by passing it through calendar rolls 40, the temperature of the sheet may be between about 175 to 300 degrees Fahrenheit.

One example of a pair of calendar rolls suitable for use in the present invention is a 24-inch by 32-inch Model 2000 ST Hydraulic 2-Roll stack available from Battenfeld Gloucester Engineering Company, Inc. and described, at least in part, in the Model 2000 Roll Stack General Information Guide and Vertical Roll Stack Operation and Maintenance Manual from Battenfeld Gloucester Engineering Company, Inc. This particular roll is equipped with electrically-powered heating and cooling elements that allow the calendar rolls to be heated or cooled as desired.

Continuing with method 200, after the sheet is smoothed, the sheet will proceed along conveyor belt 30 to an embossing station 60, which is designed to impart features to the sheet for the purpose of ultimately creating a roofing product shaped like or having the appearance of wood shakes, slate or tile. As the sheet moves toward embossing station 60 along conveyor belt 30, step 240 of cooling all or a portion of the sheet occurs.

Step 240 may occur at cooling station 50. Cooling station 50 is operable to reduce the temperature of at least a portion of the sheet. There are a number of devices that may operate as cooling station 50. For example, cooling station 50 may be a Model No. RM-30-10-70 cooling conveyor (also described as a cooling conveyor section) manufactured by EMI Corporation located in Jackson Center, Ohio and described, at least in part, in the EMI Plastics Equipment Conveyor Operation & Maintenance Manual. Alternatively, cooling station 50 may be a device such as a mister having one or more nozzles. When a mister is used, water mist is sprayed out of the one or more nozzles onto the sheet passing below. A drip pan is positioned beneath the relevant portion of conveyor belt 30 to catch the water as it runs off the sheet and the conveyor belt. The water from the drip pan or pans is then channeled automatically to one or more coolers, where it is recycled to the nozzles. In yet another embodiment, cooling station 50 may comprise the combination of a conveyor, such as a cooling conveyor, and a device configured to reduce the temperature of a portion of the sheet, such as a mister. After step 240, the temperature of the sheet may be between about 150 to 250 degrees Fahrenheit.

At step 250, the sheet is embossed. As shown in FIG. 1, the sheet travels along conveyor belt 30 to embossing station 60, which may comprise one or two rolls. Like calendar rolls 40, embossing station 60 may be separate from and in a fixed position along conveyor belt 30 or may be coupled to the conveyor such that the position of embossing station 60 may be varied along a continuous section of conveyor belt 30. Embossing station 60 may comprise two rolls where at least one of the rolls is used to emboss a portion of the sheet located on conveyor belt 30. For example, when two rolls are used as shown in FIG. 1, the one roll in the embossing station may have a textured surface so that the sheet receives features that simulate either wood, slate, or shake. The second roll may be smooth or textured. As another example, the second roll may have a surface that is smooth except for being configured to mark information on the sheet such as the date, company name, style of shingle, or additional types of information. One or more of the rolls located at embossing station 60 may be equipped with electrically-powered heating and cooling elements so that the rolls may be heated or cooled as desired. An embossing machine suitable for use as embossing station 60 is a Two Roll Vertical Closed Frame Embosser manufactured by BF Perkins located in Rochester, N.Y. and described in the Instruction Manual for BF Perkins 12" Dia.×28" Face Two Roll Vertical Closed Frame Calendar. After embossing the sheet at step 250, the temperature may be between about 130 to 220 degrees Fahrenheit.

After step 250 of embossing the sheet, the sheet may be cooled again at step 260. Cooling station 52 may be used to carry out this cooling and may be configured in the same way as cooling station 50 described above. Specifically, cooling station 52 may comprise a device configured to reduce the temperature of the sheet such as a cooling conveyor or cooling conveyor section, a mister, or both. Alternatively, cooling station 52 may comprise two devices configured to reduce the temperature of the sheet, the two devices being place side-by-side. The same type of mister described above may be used for each of these two devices in this example. In yet another embodiment, cooling station 52 may comprise two cooling conveyor sections. The same type of cooling conveyor described above may be used in this example in two 10-foot sections. As still another embodiment, cooling station 52 may comprise two cooling conveyors, each coupled to a device configured to reduce the temperature of the sheet, such as a mister. Again, the type of mister and the type of cooling conveyor described above may be used for this version of cooling station 52. After cooling the sheet at step 260, the temperature may be between about 100 to 200 degrees Fahrenheit.

To the extent that water is used with cooling stations 50, 52 and 54 (station 54 will be discussed below), the cooling stations may be coupled to each other in a way that allows the same water to be used and then recycled by each station. For example, each mister may be coupled together such that the water collected in the drip pan or pans beneath each is directed to a common cooler or coolers that include a heat exchanger. Further, such water use may be closed (i.e., new water is not added after a certain point) or open (new water is added at regular intervals).

Also, it should be understood that one or more cooling conveyors that do not use water may be used as a cooling station 50, 52 and 56. The cooling conveyor may, for example, allow the sheet to cool in the ambient air.

After cooling the sheet in step 260, step 270 involves forming multiple roofing products from the sheet. For example, a cutter 70 may be used to cut the sheet. Cutter 70 may be configured as a roll with the outer surface of the roll containing a series of knives arranged to cut multiple roofing products across either the length or the width of the sheet. An example of a cutter 70 that may be used in forming multiple roofing products is the Compact Model Web-Fed Soft Anvil Rotary Die Cutter, available from CORFINE in Dayton, Ohio. Such a cutter uses a cutting roll and a die. After step 270, the temperature of the roofing products may be between about 80 to 180 degrees Fahrenheit.

Next, at least some of the roofing products, and possibly all of them, are cooled at step 280. Such cooling may take place, for example, using cooling station 54. Cooling station 54 may comprise one or more cooling conveyors, such as, for example, four ten-foot sections of cooling conveyors. The EMI cooling conveyors described above may be used to accomplish this task. Alternatively, as with the other cooling stations, a device configured to reduce the temperature of the sheet—such as a mister—may be used with regular conveyors. One or more of such devices may be used in this regard, and the misters described above may be used as the device. After step 280, the cooled shingle may be between about 70 to 175 degrees Fahrenheit.

The position of the finished shingles is shown as numeral 80 in FIG. 1.

Figure 4:
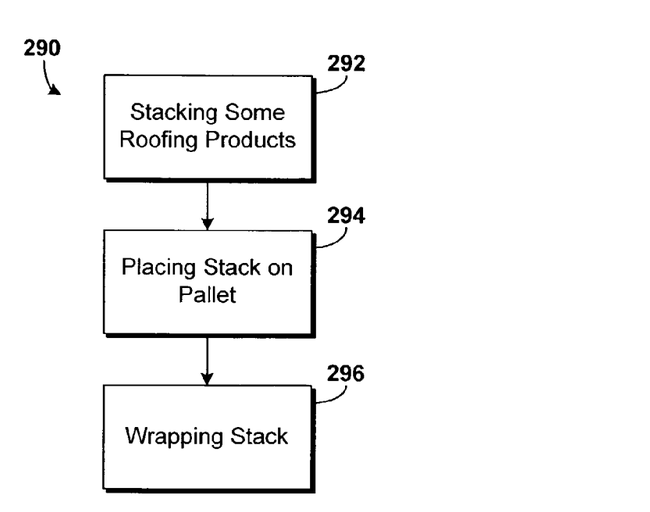
FIG. 4 is a flowchart illustrating one embodiment of the process of bundling the shingles.

After cooling at least some of the shingles according to step 280, step 290 involves bundling at least some of the shingles. Step 290 may occur at station 120 as shown in FIG. 1. As best shown in FIG. 4, one embodiment of bundling step 290 involves stacking some of the shingles to form a stack at step 292, placing the stack on a pallet at step 294 and wrapping the stack at step 296. The stacking, placing and wrapping steps may be accomplished using an automated procedure. This means that the procedure is designed to accomplish the stacking, placing, and wrapping without human intervention, although human intervention may be used at times to address malfunctions or to manually override the automation.

Figure 2B:
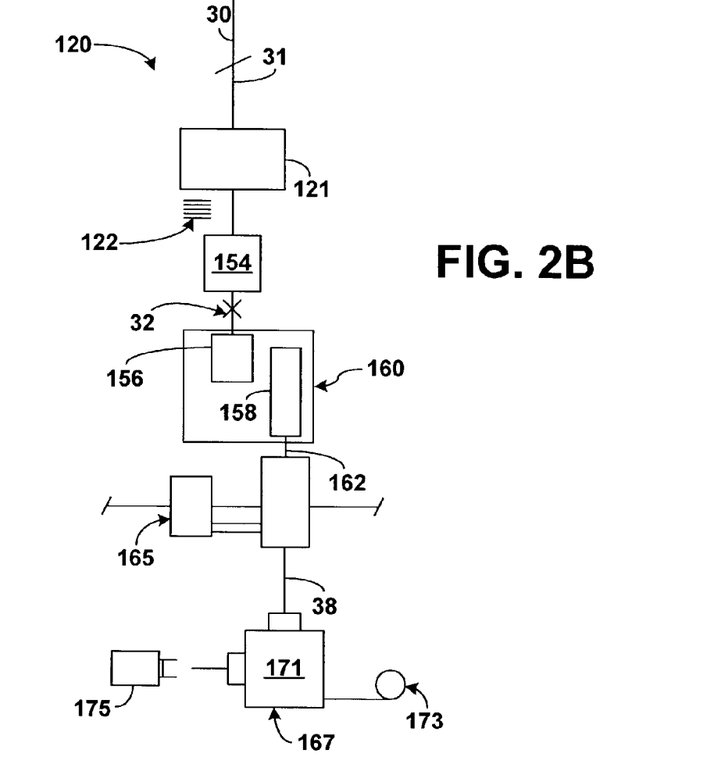
FIG. 2B is a schematic representation showing one embodiment of equipment that may be used to perform the bundling step of the present invention.

FIG. 2B illustrates a layout of the equipment that may be used to carry out one embodiment of steps 292, 294 and 296. In particular, conveyor 30 may be linked to a variable speed conveyor 31 that is available from Van Pak Corporation located in Maryland Heights, Mo. Variable speed conveyor 31 carries the shingles to a robot 121 that is configured to place the shingles into stacks 122. Robot 121, therefore, may be configured to carry out step 292. The speed of variable speed conveyor 31 may be set with respect to the speed of conveyor 30 to create space between the parts as they are delivered to robot 121. An example of robot 121 is the Industrial Robot IRB140 available from ABB of Vasteras, Sweden.

Robot 121 is configured to place stacks 122 in the loading queue of a strapper 154. Strapper 154 may be configured to place one or more straps around stack 122 to ensure that the shingles are aligned with each other. For example, strapper 154 may be configured to strap stack 122 across the width of the shingles. Strapped stack 122 may then be ejected from strapper 154 onto a conveyor 32 equipped with a turning cross (represented by the letter "X"). A conveyor such as conveyor 32 is also available from the Van Pak Corporation. Conveyor 32 is operable to rotate a strapped stack 90-degrees and return the rotated stack to strapper 154 to be strapped again across the length of the shingles. A suitable strapper for use as strapper 154 is the Model TR3C 700/550 In-Line Strapping Machine available from EAM-Mosca Corporation located in West Hazleton, Pa. Such a strapping machine may be altered from its stock condition to include guides and stops that will cause the stacks to be in the proper location for the strapping to take place.

Alternatively, conveyor 32 may be configured to advance the strapped stack 122 to a palletizer 160 which is operable to place the stack on a pallet and, therefore, may be used to accomplish step 294 of placing a stack 122 on a pallet. An example of a suitable palletizer for use as palletizer 160 is the Series 2000 Gantry Palletizer available from the Van Pak Corporation. Palletizer 160 may be equipped with a gantry-style robot to pick up an incoming stack 122 with vacuum cups and deliver it to a pallet at the loading station 158. The robot may be configured to place stack 122 on a pallet in multiple orientations to best ensure that the pallet is mechanically stable. For example, the robot may be configured to rotate a stack placed on top of another bundle by 90 degrees. Palletizer 160 also may be equipped with one or more loading stations 158 for stacking strapped stacks 122 on one or more pallets. Finally, queuing stations 156 may be provided as part of conveyors 32 or as part of palletizer 160. Queuing stations 156 are configured to queue strapped stacks 122 prior to the palletizing of the stacks.

Once a pallet has been loaded with one or more stacks 122, the loaded pallet may be ejected from the loading station by a powered chain conveyor 162 and delivered by a shuttle conveyor and dual conveyor shuttle car system 165. Suitable chain conveyors and shuttle conveyor and dual conveyor shuttle car systems are available from the Van Pak Corporation. Shuttle conveyor and dual conveyor shuttle car system 165 may be configured to accept loaded pallets from palletizer 160 and deliver them to a wrapping station 167. The process for transferring the loaded pallets from palletizer 160 to wrapping station 167 involves the dual shuttle car shifting on its shuttle conveyor to align with the loading station that is ready to deliver a loaded pallet, accepting a loaded pallet, and then shifting along its shuttle conveyor to align with power chain conveyor 38, which communicates with wrapping station 167. Empty pallets may be loaded into one or more pallet dispensers 169, which can then transfer the empty pallets back to one or more loading stations 158 for use by palletizer 160.

Wrapping step 296 of the present sheet line methods may be carried out at, for example, wrapping station 167 which includes a stretch wrapper 171, such as the model FA-66 Orion Automatic Stretch Wrapping Machine available from Orion Packaging Systems, Inc. in Collierville, Tenn. Wrapping film may be fed to stretch wrapper 171 from a supply wheel 173. Loaded pallets are then wrapped (e.g., stretch wrapped) using stretch wrapper 171. The wrapped pallet may then be ejected onto a powered chain conveyor (available from Van Pak Corporation) and queued. A lift truck 175 may then take the wrapped pallet to storage or to another location.

Figure 5:
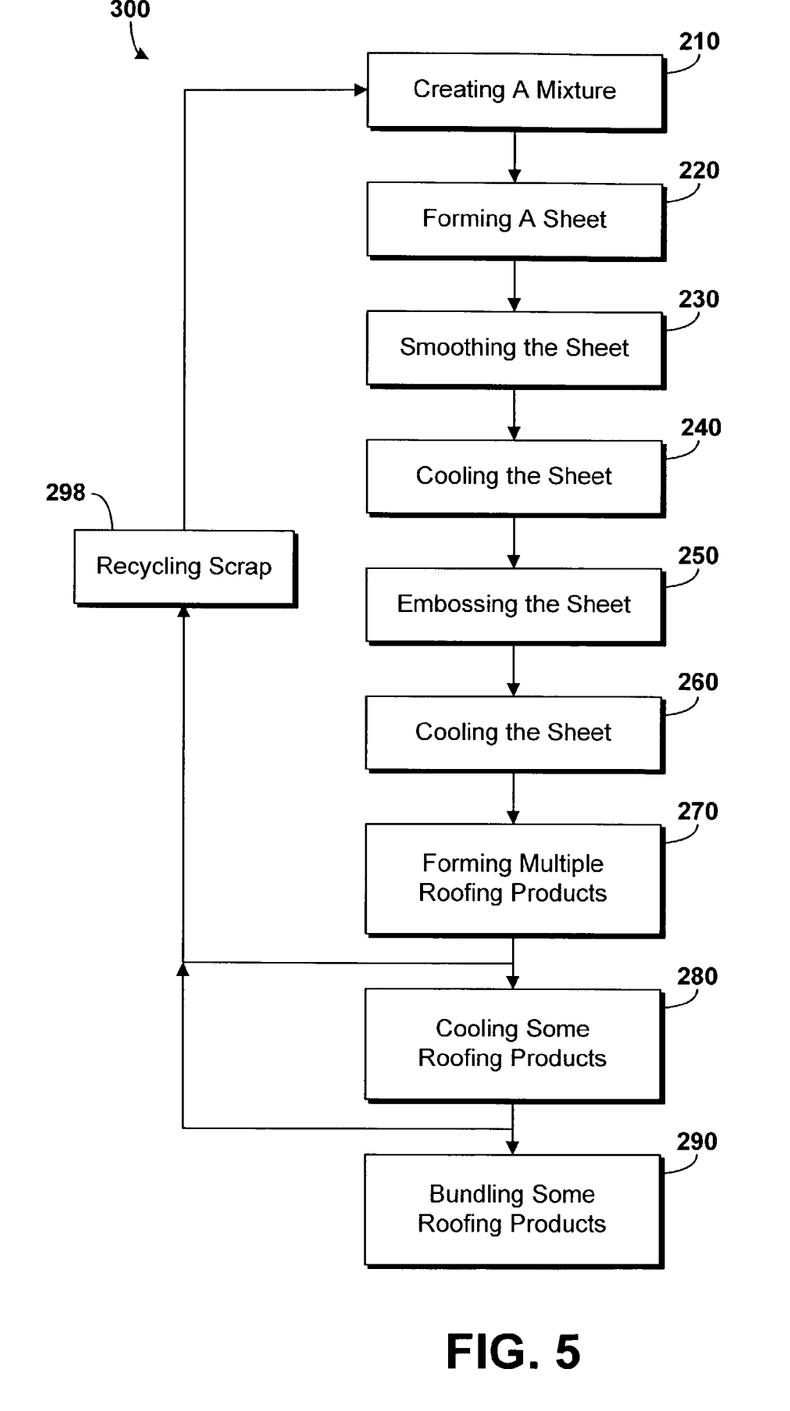
FIG. 5 is a flowchart illustrating the process in FIG. 3 with the addition of a recycling step.

As shown in FIG. 5, in an alternative method 300, step 298 includes recycling scrap from the cutting of step 270. This recycling step may be carried out by collecting scrap from the sheet and routing the scrap back to extruder 10 along another conveyor (not shown in FIG. 1). The scrap may then be placed back into extruder 10 and reused in method 300. This recycling may start at one or more locations along conveyor belt 30 (see also FIG. 5). For example, FIG. 1 shows that scrap may be taken at points 90 and 100, at cutter 70 beyond cooling station 54, and routed back to extruder 10 as indicated by arrow 110. One way in which this recycling may be achieved at point 90 involves scrap material falling away from conveyor 30 to another, underlying conveyor after the sheet is cut. The underlying conveyor (not shown) will then route the scrap to a grinder (also not shown) such as a Rapid Granulator Model R-36 available from Rapid Granulator, Inc. in Rockford, Ill. The grinder then grinds the scrap material to a desired state. Next, the ground scrap may be conveyed to a storage bin for use at an appropriate future time. At the desired time, which may be preset as part of the automated process, the ground material may be transported from the bin to a feeder, such as feeder/material handler 20 shown in FIG. 2A, for re-introduction into mixer 10. This transportation may take place in any suitable way, including, for example, by a vacuum connecting to the bin to the feeder.

Some or all of the steps of methods 200 and 300 may be performed using an automated procedure. This means that the steps performed in this manner are designed to be accomplished without human intervention, although human intervention may be used at times to address malfunctions or to manually override the automation. Step 210 of creating a mixture having a filler and a polymer will, when using an automated procedure, be understood not to exclude steps that involve human intervention to place starting materials in the appropriate locations from which the remainder of the process can be accomplished.

Injection Molding Methods

Figure 6:
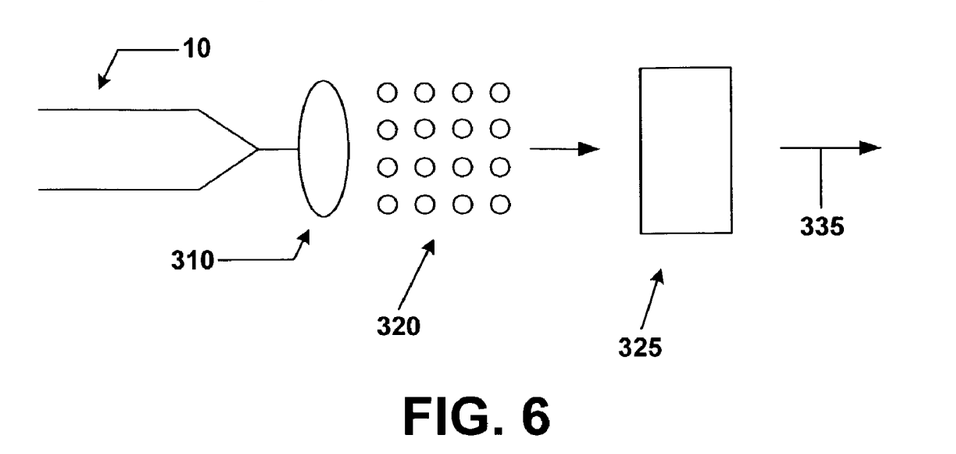
FIG. 6 is a schematic representation of one embodiment of an injection molding layout process of the present invention.
Figure 7:
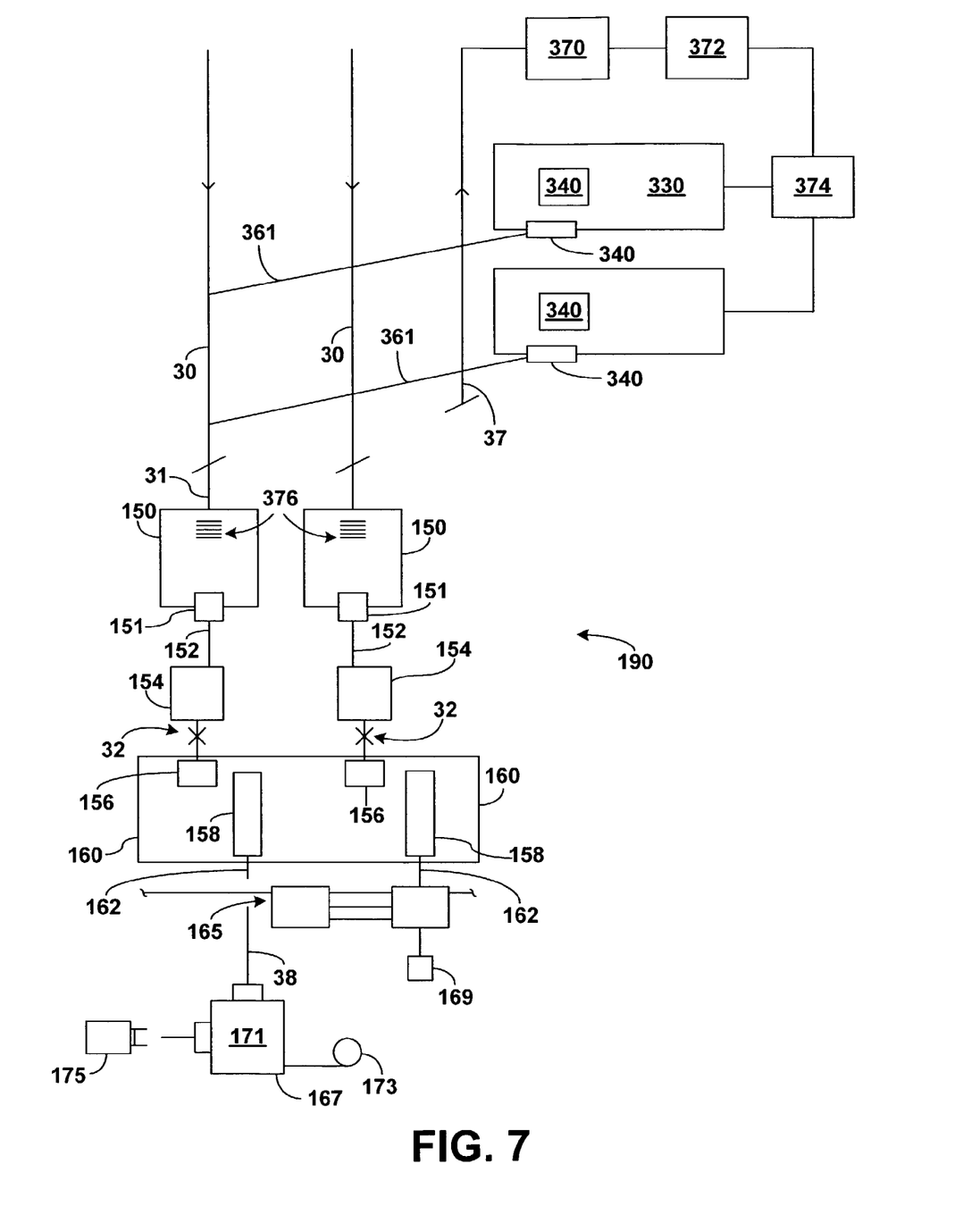
FIG. 7 is a schematic representation of the injection molding layout process continued from FIG. 6.
Figure 8:
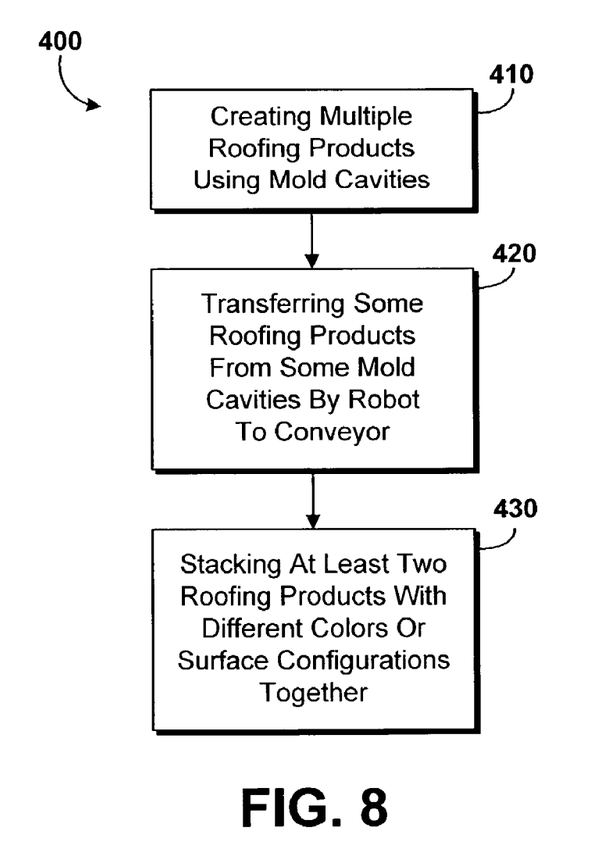
FIG. 8 is a flowchart illustrating one embodiment of the injection molding process.

One or more of the present methods also may be used in accordance with the injection molding systems shown in FIGS. 6 and 7. One such method is illustrated in FIG. 8 and generally referred to by the numeral 400. In particular, step 410 of method 400 is creating multiple shingles using mold cavities. (The phrase "mold cavities" does not include what are known in the art as dies.)

It should be understood that carrying out step 410 may be achieved in a variety of ways. One way to carry out step 410 involves use of the pelletizer schematically shown in FIG. 6. Extruder 10, which may be the CP2500 discussed above, may be used to create a mixture having a polymer and a filler such as the polymer and filler discussed above. As best seen in FIG. 6, the mixture may then be pushed through pelletizer 310 and cut using pelletizer 310 to form one or more pellets 320. The process of creating pellets may be referred to as pelletizing the mixture. A suitable pelletizer is an Underwater Pelletizer Model MAP-7 from Gala Industries, Inc located in Eagle Rock, Va. This pelletizer may be attached to the end of extruder 10.

Preferably, the size of pellets 320 created using pelletizer 310 will between about 0.110 and 0.150 inches in diameter. It will be understood that other diameters may be more suitable for other applications. The temperatures of the mixture going into the pelletizer may be between about 350 to 400 degrees Fahrenheit. The temperature of the resulting pellets may be between about 100 to 150 degrees Fahrenheit.

As shown in FIG. 6, pellets 320 may then be dried using a dryer 325. Dryer 325 is useful where pellets 320 have been created using an underwater pelletizer, such as the Gala pelletizer discussed above. However, if pellets 320 are not created using a liquid then dryer 325 may not be necessary. When the pellets are finished drying, their temperature may be between about 80 to 150 degrees Fahrenheit. A suitable dryer for use as dryer 325 is the Centrifugal Pellet Dryer Model 16.3 BF ECLN, available from Gala Industries, Inc. After drying, pellets 320 may be routed to storage, as indicated by arrow 335.

Continuing with step 410, pellets 320 may be taken from storage, or routed directly from dryer 325, and placed in one or more injection molders 330 as best seen in FIG. 7. Each injection molder 330 that is used may include a mixing barrel designed to mix the pellets and raise the temperature of the pellet material (e.g., the mixture referenced above) to a molten state, or between about 350 to 500 degrees Fahrenheit. Each injection molder 330 that is used may include a single-screw with a barrel that is externally heated to raise the temperature of the pellet material. The pellets may be heated by the external heater of the barrel, and by the friction created between the screw rotor, the pellet material, and the inside of the screw barrel. If a colorant is used, it may be added during the mixing of the pellet material in a given injection molder 330.

FIG. 7 shows two injection molders 330 being used in the present invention. It will be understood, however, that as few as one injection molder may be utilized with the present methods, provided the injection molder includes a mold having two or more cavities. Further, as many injection molders 330 as desired may also be used, such as 15, for example. Colorant may be added using a volumetric or gravimetric color feeder, such as the Thoresen McCosh WSB-260T available from Thoreson McCosh in Troy, Mich., that is coupled to one or more of the injection molders 330. An injection molder suitable for use as one of these injection molders is the Van Dorn HT Model 500 injection molder manufactured by Van Dorn Demag Corporation in Strongsville, Ohio.

Continuing with a description of how one injection molder 330 operates—with the understanding that multiple injection molders may be used and that this description applies to as many as are used—from injection molder 330, the mixture will be heated and injected into the mold cavities 340. If only one injection molder 330 is used, multiple mold cavities 340 (e.g., two, three or more) should be used consistent with the present methods. If multiple injection molders are used, each injection molder may have as few as one mold cavity 340, although two, three, or more mold cavities 340 may be used in each of the multiple injection molders. Throughout this disclosure, however, a single block 340 in each injection molder 330 represents one or more mold cavities, and this description will sometimes discuss the operation and use of a single mold cavity 340 in explaining the present methods.

Mold cavity 340 will be cast or machined to have one or more surfaces configured to resemble wood shake, slate or tile shingles. Mold cavity 340 may be made in two, three, or more pieces, and may be made of metal such as P20. Mold cavity 340 may be machined to have a surface or surfaces formed using digitized modeling. The digitized model may be of the target shingle, such as shake, slate or tile, and each mold cavity 340 may be configured to produce a separate product.

As part of step 410, the shingles created may be cooled by running water or another suitable coolant through the one or more mold cavities 340. This type of cooling may serve to restrict the flow of the mixture into the mold cavity. The amount of mixture to be placed in each mold cavity may be determined by weight or volume, which is determined substantially by the desired size and shape of the shingles being formed.

After step 410, and after the shingles in mold cavities 340 have been sufficiently cooled to a temperature of between about 70 to 170 degrees Fahrenheit, step 420 may occur. More specifically, step 420 involves transferring some of the shingles from some of the mold cavities to a conveyor or multiple conveyors, such as conveyor belts 30 in FIG. 7, using one or more robots 360. A suitable robot for use as robot 360 is the Sailor model RZ-300N2S-M3L available from Sailor USA located in Kennesaw, Ga. Each robot 360 may be positioned about the clamp (not shown) of an injection molder 330. Once the molding process is complete and the product is ready to be removed from the mold cavities, the clamp of injection molder 330 will open and robot 360 will remove the finished part or parts from the mold cavity or cavities. Robot 360 may then move along a beam 361 that allows it to translate between injection molder 330 and conveyor 30. Robot 360 will place the part on conveyor 30, where it will travel to a packaging area. As shown in FIG. 7, beams 361 may be configured to allow the robot of each injection molder to access either conveyor 30. Examples of suitable conveyor belts for use as conveyor 30 in FIG. 7 are TEC's Classic Steel Horizontal Conveyors available from TEC Engineering, located in Oxford, Mass.

Figure 10:
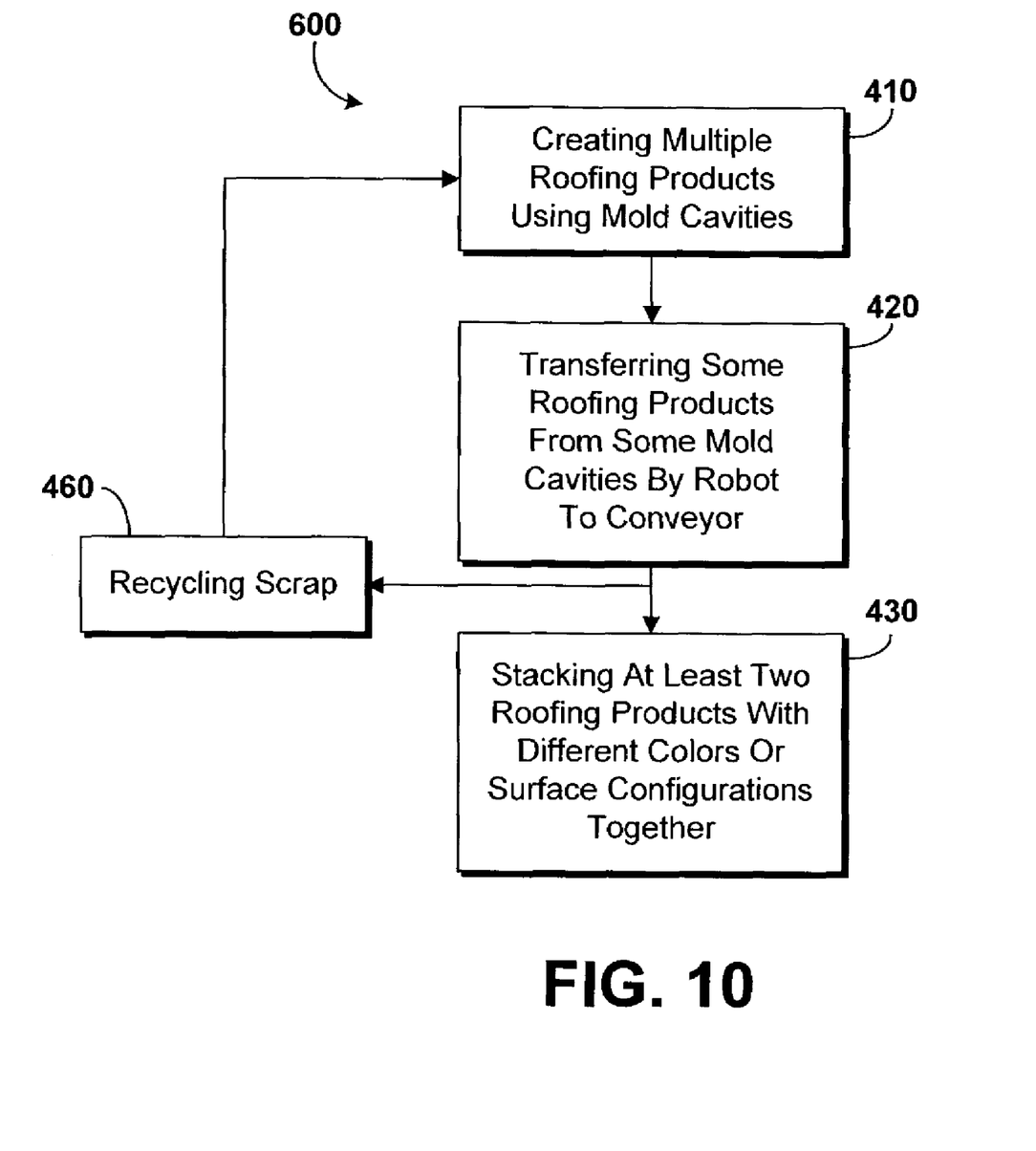
FIG. 10 is a flowchart similar to FIG. 8 with an additional step of recycling the scrap.

Recycling of scrap material at step 460 of method 600 shown in FIG. 10 may also be started at this point of the process. One way of recycling scrap involves the use of a conveyor, such as conveyor 37, which may be a TEC Classic Steel Horizontal Conveyor available from TEC Engineering. Conveyor 37 may be positioned along the path accessible on beam 361 by robot 360. As robot 360 travels along its beam, it may stop at conveyor 37, break off any runner or other scrap material attached to the finished product it is transporting, and place that scrap material onto conveyor 37. Conveyor 37 may then transport the scrap material to a grinder 370 such as a Rapid Granulator Model R-36, available from Rapid Granulator, Inc. located in Rockford, Ill. After the scrap material is ground using grinder 370, it may be transported to a storage bin 372, which may be preset as part of an automated process. Blender 374 may then re-mix the ground scrap with any other desired materials and deposit the blended material back into the feed throats of one or more of the injection molders 330.

Although not shown with a cooling station or stations such as those described above, conveyor belts 30 may be equipped with such cooling stations in order to cool the roofing products placed on conveyor belts 30 by robots 360.

Each injection molder 330 may be configured to produce finished shingles of a certain color. The mold cavities or cavities 340 in each injection molder 330, will produce the same colored shingles as a result. Different injection molders may be configured to produce shingles with different colors.

After step 420, at least two roofing products or shingles with either different colors or different surface configurations will be positioned beside each other on a conveyor belt 30. By different colors it will be understood that two colors have different hues, different values, or different chroma on the Munsell scale. The use of "different" in the phrases "different colors" and "different surface configurations" does not include those differences due to chance. The differences to which we refer to are those that are purposefully created.

Such different products will then travel along conveyor belts 30 to station 190, where step 430 may be carried out. Step 430 involves stacking together at least two of the shingles that have different colors or different surface configurations. Two such stacks are represented in FIG. 7 by the numeral 376. Of course, more than two shingles may be included in such a stack, however, at least two of them must have different colors or different surface configurations.

Figure 9A:
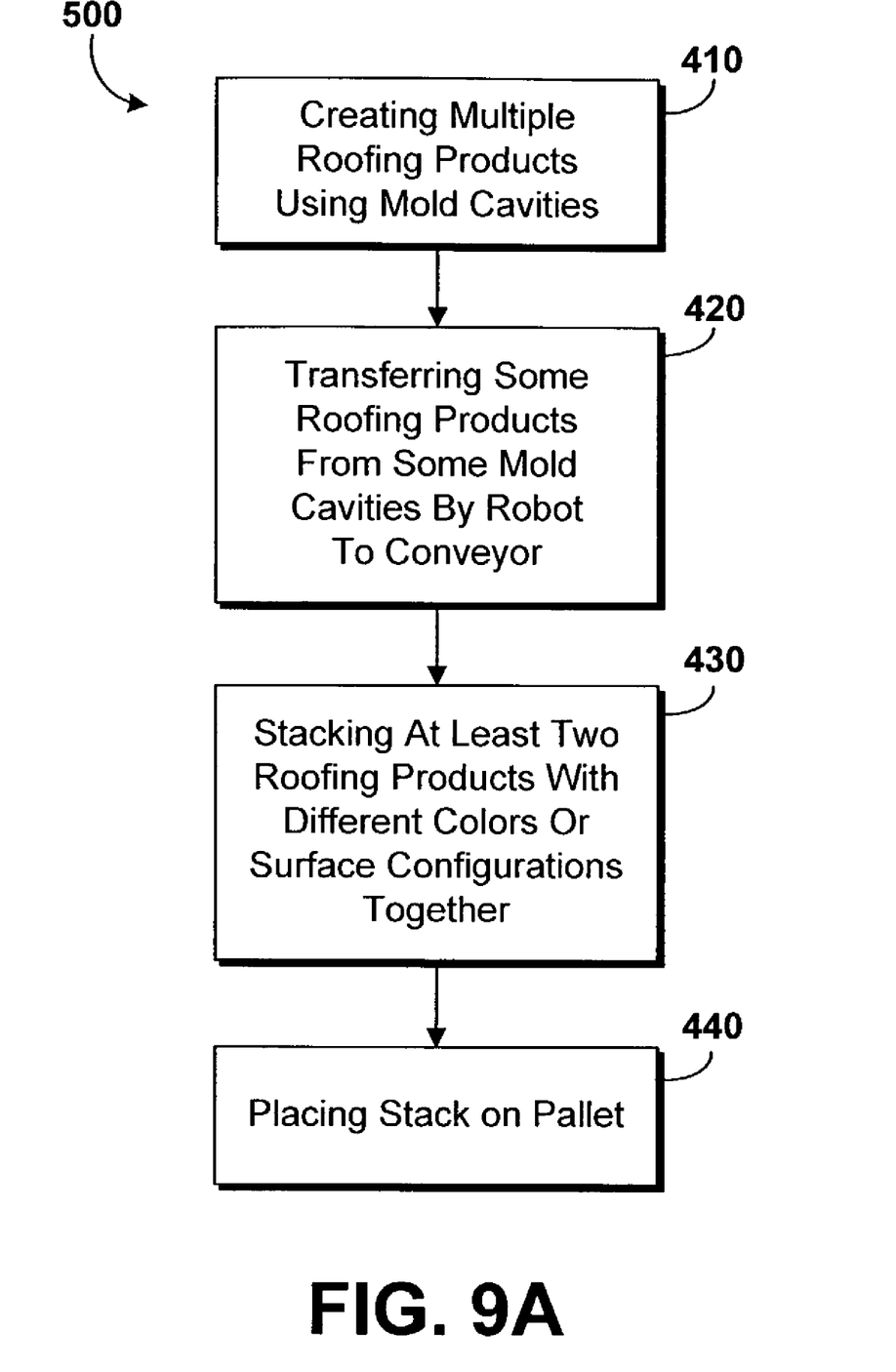
FIG. 9A-9C are flowcharts similar to FIG. 8 with the additional steps of palleting, wrapping, and strapping the stack.

Another method of the present invention is illustrated in FIG. 9A and is labeled as numeral 500. Method 500 involves additional use of station 190. In addition to steps 410, 420 and 430 as described above, method 500 includes taking the stack created in step 430 and placing it on a pallet in step 440. Further, method 510, shown in FIG. 9B includes steps 410-440 of method 500, and the additional step 450 of wrapping the stack. Method 520 shown in FIG. 9C includes steps 410-450 of method 510 and the additional step 445 of placing a strap around the stack, which as described previously may take place prior to the wrapping of the stack. As in the case of steps 292, 294 and 296 discussed above, the stacking, placing, strapping and wrapping steps of methods 500, 510 and 520 may be accomplished using an automated procedure.

Figure 9B:
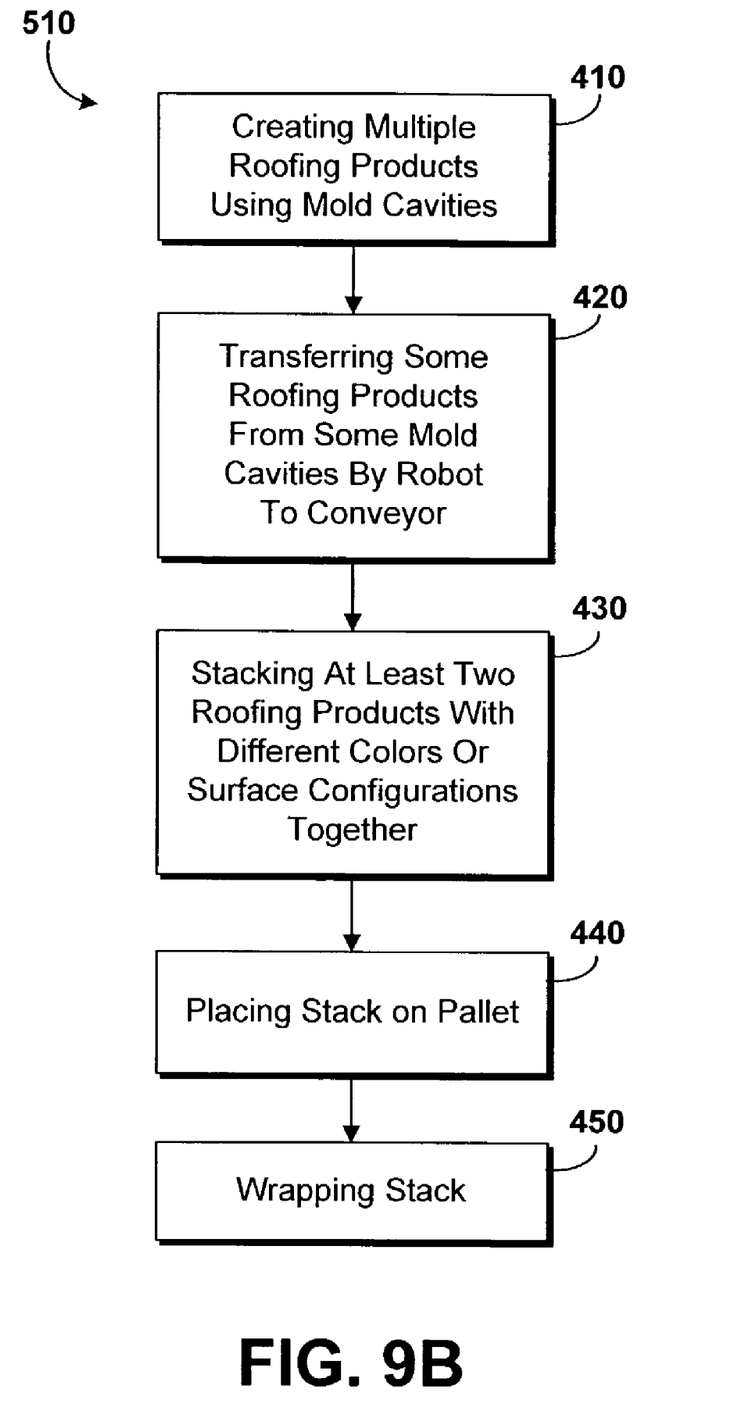
Figure 9C:
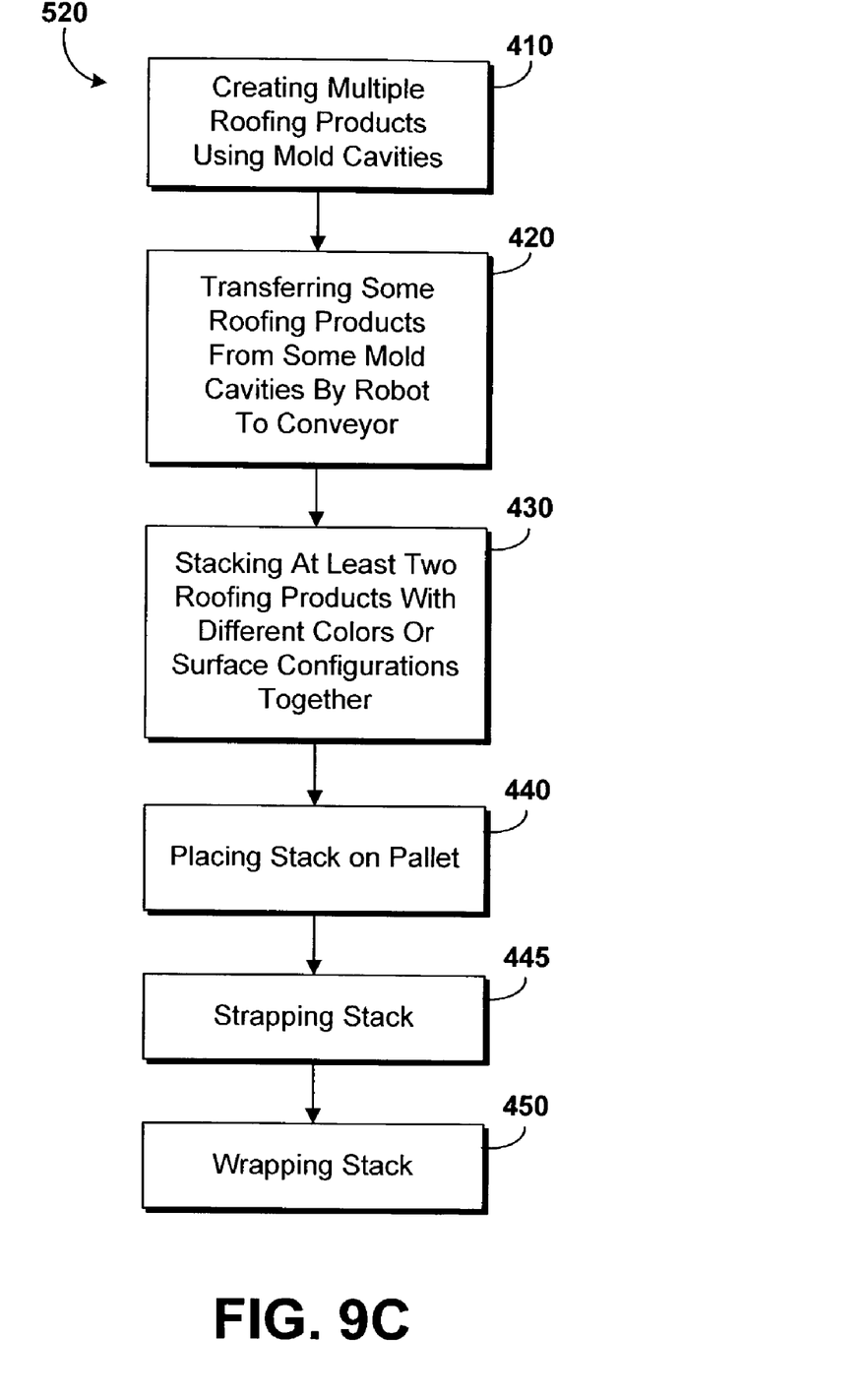

Returning to FIG. 7, one example of the equipment that may be used for station 190 to accomplish one or more of steps 430, 440, 445 and 450 of FIGS. 8-9C is shown. As best seen in FIG. 7, each conveyor 30 may be linked to a variable speed conveyor 31 that is available from Van Pak Corporation, Maryland Heights, Mo. Each variable speed conveyor 31 carries the shingles to a stacker 150. The speed of variable speed conveyor 31 may be set with respect to the speed of conveyor 30 so as to position the parts at a distance apart from one another as they are delivered to the stacker 150. An example of a suitable stacker is a Van Pak Vertical Stacker (i.e., a Lowerator) from the Van Pak Corporation. Stacker 150 stacks multiple finished shingles (e.g., up to 15). Stacker 150 may be configured to carry out step 430 of stacking at least two roofing products with different colors or surface configurations together to create stack 376. The number of stackers 150 used will depend on the number of incoming conveyors 30—generally, there is a one-to-one correspondence.

As shown in FIG. 7, each stacker 150 may be provided with a queuing station 151 into which stacks 376 are inserted. Stacker 150 may then index downwardly and deliver a given stack 376 onto another conveyor 152 that transports the stack to strapper 154. Suitable conveyors for conveyor 152 are available from the Van Pak Corporation.

Strapper 154 may be configured to carry out step 445 by placing one or more straps around stack 376. Using straps helps ensure that the roofing products become and remain aligned with each other. For example, strapper 154 may be configured to strap stack 376 across the width of the roofing products. The strapped stack may then be ejected from strapper 154 onto a conveyor 32 equipped with a turning cross represented by the letter "X" (such a conveyor is also available from the Van Pak Corporation). Conveyor 32 may be configured to rotate a strapped stack 90 degrees and return the rotated stack to strapper 154 to be strapped again across the length of the shingles. A suitable strapper for use as strapper 154 is an EAM Mosca Model TR3C 700/550 In-Line Strapping Machine available from the EAM-Mosca Corporation, West Hazelton, Pa. Such a strapping machine may be altered from its stock condition to include guides and stops configured so as to position the stacks in the proper location for the strapping to take place.

Alternatively, conveyor 32 may be configured to advance the strapped stack 376 to a palletizer 160. Queuing stations 156 may be provided as part of conveyors 32 or as part of palletizer 160. These queuing stations are configured to queue strapped stacks 376 to the palletizing of the stacks.

An example of a suitable palletizer for use as palletizer 160 is the Series 200 Gantry Palletizer available from the Van Pak Corporation.

Palletizer 160 may be equipped with one or more loading stations 158 for stacking strapped stacks 376 on one or more pallets, which may be made of wood. This process may be used to accomplish step 440 of placing a stack on a pallet. Palletizer 160 may be equipped with a gantry-style robot to pick up an incoming stack 376 with vacuum cups and deliver it to a pallet on one of the loading stations 158. The robot may be configured to place stack 376 on a pallet in multiple orientations to best ensure that the loaded pallet is mechanically stable. For example, the robot may be configured to rotate a stack placed on top of another bundle by 90 degrees.

Once a pallet has been loaded with strapped stacks 376, the loaded pallet may be ejected from the loading station by a powered chain conveyor 162 and delivered by a shuttle conveyor and dual conveyor shuttle car system 165. Shuttle conveyor and dual conveyor shuttle car system 165 may be configured to accept loaded pallets from palletizer 160 and deliver them to wrapping station 167. The process for this transfer of the loaded pallets from the palletizer to the wrapping station involves the dual shuttle car shifting on its shuttle conveyor to align with the loading station that is ready to deliver a loaded pallet, accepting that loaded pallet, and then shifting along its shuttle conveyor to align with power chain conveyor 38, which communicates with wrapping station 167. Empty pallets may be loaded into one or more pallet dispensers 169, which can then transfer the empty pallets back to one or more loading stations 158 for use by palletizer 160.

Wrapping step 450 of the present invention may be carried out at, for example, wrapping station 167, which may include a stretch wrapper 171, such as the model FA-66 Orion Automatic Stretch Wrapping Machine available from Orion Packaging Systems, Inc. in Collierville, Tenn. Wrapping film may be fed to stretch wrapper 171 from a supply wheel 173. Loaded pallets are then wrapped (e.g., stretch wrapped) using stretch wrapper 171. The wrapped pallet may then be ejected onto a powered chain conveyor (available from the Van Pak Corporation) and queued. A lift truck 175 may then take the wrapped pallet to storage.

Some or all of the steps in methods 400, 500 and 600 may be performed using an automated procedure. Step 410 of creating multiple shingles using mold cavities will, when using an automated procedure, be understood not to exclude steps that involve human intervention to place starting materials in the appropriate locations from which the remainder of the creating step can occur.

The purpose of stacking together different roofing products or shingles with different colors (not different colors within a given roofing product, but different colors of different roofing products) or different surface configurations is to provide builders/roofers with the option of easily applying such differently-colored or configured roofing products to a single roof. This is an attractive option where the colors differ by chroma or value. The convenience of not needing to mix the roofing products from one pallet with the roofing products of another pallet on site in order to achieve a multi-colored roof or a roof that includes roofing products with different textures is one that is not enjoyed in the prior art.

It should be understood that the steps of the present methods need not be carried out exactly as described above to fall within the scope of the claims and their equivalents. For example, the cooling of the sheet may be carried out using pressurized air, as opposed to pressurized water or ambient air. Additionally, while particular embodiments of the invention have been shown, it will be understood, of course, that the invention is not limited thereto, since modifications may be made by those skilled in the art, particularly in light of the foregoing teachings. Reasonable variation and modification are possible within the scope of the foregoing disclosure of the invention without departing from the spirit of the invention.

We claim:

1. A method of making roofing products, said method comprising:
    (a) creating composite roofing products using a mold with at least two mold cavities configured to simultaneously produce at least two different roofing products;
    (b) using at least one robot to transfer some of the roofing products from some of the mold cavities to a conveying system;
    (c) placing a plurality of the different roofing products into a plurality of rows with the at least one robot; and
    (d) stacking together at least two of the roofing products in each row to form a stack, wherein at least some of said roofing products in a stack are different.

2. The method of claim 1 wherein said creating step is performed in an injection molder.

3. The method of claim 1 wherein said roofing products are placed in a plurality of rows each on a respective conveyor of the conveying system.

4. The method of claim 2 further comprising the step of placing said stacks on a pallet.

5. The method of claim 4 further comprising the step of wrapping the stacks.

6. The method of claim 5 further comprising the step of placing a strap around each stack.

7. The method of claim 1 wherein at least one of the mold cavities has a surface formed using a digitized model.

8. The method of claim 1 wherein the different roofing products comprise different colors.

9. The method of claim 1 wherein the different roofing products comprise different widths.

10. The method of claim 1 wherein the different roofing products comprise different surfaces.

* * * * *